(12) United States Patent
Mimura (10) Patent No.: US 7,598,874 B2
(45) Date of Patent: *Oct. 6, 2009

(54) INTEGRATED-CIRCUIT ENCLOSED RETROREFLECTIVE PRODUCT

(75) Inventor: Ikuo Mimura, Toyama (JP)

(73) Assignee: Nippon Carbide Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/685,237

(22) Filed: Mar. 13, 2007

(65) Prior Publication Data

US 2007/0194133 A1    Aug. 23, 2007

Related U.S. Application Data

(62) Division of application No. 10/480,193, filed as application No. PCT/JP2002/06070 on Jun. 18, 2002, now Pat. No. 7,224,279.

(30) Foreign Application Priority Data

Jun. 19, 2001    (JP)    ............................. 2001-185404

(51) Int. Cl.
*G08B 13/14*    (2006.01)

(52) U.S. Cl. ............... 340/572.7; 340/572.8; 340/693.5

(58) Field of Classification Search ............. 340/572.1, 340/572.7, 572.8, 572.9, 693.5; 235/494
See application file for complete search history.

(56) References Cited

U.S. PATENT DOCUMENTS

| | | | |
|---|---|---|---|
| 3,190,178 A | 6/1965 | McKenzie | |
| 3,830,682 A | 8/1974 | Rowland | 161/2 |
| 4,025,159 A | 5/1977 | McGrath | 350/105 |
| 4,200,875 A | 4/1980 | Galanos | 346/1.1 |
| 4,498,733 A | 2/1985 | Flanagan | 350/102 |
| 4,588,258 A | 5/1986 | Hoopman | 350/103 |
| 4,775,219 A | 10/1988 | Appeldorn et al. | 350/103 |
| 4,801,193 A | 1/1989 | Martin | 350/103 |
| 5,117,304 A * | 5/1992 | Huang et al. | 359/529 |
| 5,153,842 A | 10/1992 | Dlugos, Sr. et al. | 364/478 |
| 5,237,164 A | 8/1993 | Takada | 235/487 |
| 5,264,063 A | 11/1993 | Martin | 156/247 |
| 5,376,431 A | 12/1994 | Rowland | 428/164 |
| 5,477,219 A | 12/1995 | Zarembo et al. | 340/572.3 |
| 5,705,852 A | 1/1998 | Orihara et al. | 257/679 |
| 5,706,132 A | 1/1998 | Nestegard et al. | 359/529 |
| 5,764,413 A | 6/1998 | Smith et al. | 359/530 |
| 5,831,767 A | 11/1998 | Benson et al. | 359/529 |
| 5,840,405 A | 11/1998 | Shusta et al. | 428/156 |
| 5,840,406 A | 11/1998 | Nilsen | 428/156 |
| 5,844,712 A | 12/1998 | Caroli | 359/529 |
| 5,854,709 A | 12/1998 | Couzin | 359/529 |
| 5,889,615 A | 3/1999 | Dreyer et al. | 359/529 |
| 5,898,523 A | 4/1999 | Smith et al. | 359/530 |

(Continued)

FOREIGN PATENT DOCUMENTS

EP    0 269 329    6/1988

(Continued)

*Primary Examiner*—John A Tweel, Jr.
(74) *Attorney, Agent, or Firm*—Fitzpatrick, Cella, Harper & Scinto (57) ABSTRACT

An integrated circuit enclosed retroreflective product which comprises an integrated circuit module having built-in integrated circuit(s), a retroreflective element, and their carrier layer(s).

6 Claims, 4 Drawing Sheets

U.S. PATENT DOCUMENTS

| | | | |
|---|---|---|---|
| 5,914,812 A | 6/1999 | Benson et al. | 359/529 |
| 5,981,032 A | 11/1999 | Smith et al. | 428/167 |
| 5,988,820 A | 11/1999 | Huang et al. | 359/530 |
| 6,083,607 A | 7/2000 | Mimura et al. | 428/167 |
| 6,155,689 A | 12/2000 | Smith | 359/530 |
| 6,157,486 A | 12/2000 | Benson et al. | 359/498 |
| 6,160,526 A | 12/2000 | Hirai et al. | 343/895 |
| 6,206,525 B1 | 3/2001 | Rowland et al. | 359/530 |
| 6,390,629 B1 | 5/2002 | Mimura et al. | 359/530 |
| 6,542,083 B1 | 4/2003 | Richley et al. | 235/494 |
| 6,758,405 B2 | 7/2004 | Look | 340/494 |
| 6,894,615 B2 | 5/2005 | Look | 340/572.1 |
| 7,076,083 B2 * | 7/2006 | Blazey | 340/10.1 |
| 7,224,279 B2 * | 5/2007 | Mimura | 340/572.7 |
| 2001/0002035 A1 | 5/2001 | Kayanakis | |
| 2002/0024475 A1 | 2/2002 | Okamura et al. | 343/895 |

FOREIGN PATENT DOCUMENTS

| | | |
|---|---|---|
| EP | 0 761 020 | 3/1997 |
| EP | 0 830 621 | 3/1998 |
| EP | 0 887 665 | 12/1998 |
| EP | 1 014 301 | 6/2000 |
| EP | 1 033 778 | 9/2000 |
| EP | 1 039 411 | 9/2000 |
| EP | 1 081 511 | 3/2001 |
| EP | 1 164 390 | 12/2001 |
| JP | 59-58630 | 4/1984 |
| JP | 1-231004 | 9/1989 |
| JP | 4-229244 | 8/1992 |
| JP | 9-508983 | 9/1997 |
| JP | 11-505050 | 5/1999 |
| JP | 11-305017 | 11/1999 |
| JP | 2001-130179 | 5/2001 |
| WO | WO 96/10197 | 4/1996 |
| WO | WO 98/59266 | 12/1998 |
| WO | WO 99/54760 | 10/1999 |

* cited by examiner

INTEGRATED-CIRCUIT ENCLOSED RETROREFLECTIVE PRODUCT

This application is a division of application Ser. No. 10/480,193 filed Dec. 10, 2003, which in turn is national stage of PCT application No. PCT/JP02106070 filed Jun. 18, 2002.

TECHNICAL FIELD TO WHICH THE INVENTION BELONGS

The present invention relates to an integrated circuit enclosed retroreflective product comprising an integrated circuit module having a built-in integrated circuit(s), a retroreflective element and their carrier layer(s).

More specifically, the invention relates to such an integrated circuit enclosed retroreflective product in which the integrated circuit module has at least one built-in radio frequency identification integrated circuit and communication antenna(s) connected to the radio frequency identification integrated circuit. The product conducts information exchange with the integrated circuit module through its external terminals or the antenna(s). Furthermore, presence of the product or approach of a person holding the product can be recognized from afar by illuminating it, particularly in the nighttime, according to the principle of retroreflection.

Still more specifically, the present invention relates to an integrated circuit enclosed retroreflective product in which said communication antenna is formed on reflective surfaces of said retroreflective element.

PRIOR ART

A conventional IC card comprises an integrated circuit module having built-in integrated circuit(s), a carrier layer to carry said module, said layer being formed of a core layer and/or an inner layer, and an upper protective layer and a lower protective layer for protecting the upper face and the lower face of the carrier layer, respectively. This laminate exchanges information between the integrated circuit and external units through external contact terminals provided on, for example, said upper protective layer, or a communication antenna which is installed on the carrier layer.

Such a conventional contact type IC card provided with external contact terminals performs for example, exchange of electronic signal informations with external read-and-write units (reader/writer), or receives power supply, through the external contact terminals provided on said upper protective layer.

Known non-contact type IC card installed with a communication antenna (or simply, "antenna") receives power supply and exchanges electronic signal informations between its integrated circuit module of integrated circuits, e.g., radio frequency identification system integrated circuits, and any external reader/writer, through the antenna installed on its carrier layer. Such non-contact type IC cards are further classified, according to the distance between the involved integrated circuit enclosed laminate and external reader/writers communicatable therewith, into close coupling type (within 2 mm), proximity coupling type (within 10 cm), vicinity coupling type (within 70 cm) and distance coupling type (more than 70 cm). In general, short waves are used for the close coupling and proximity coupling types which emit radio waves over short ranges; long waves are used for vicinity coupling type and microwaves, for distance coupling type.

Various methods for forming such a non-contact type IC card with an antenna installed therein have been proposed. As methods for forming the antenna, a method of forming an antenna by partially removing a previously installed metallic layer by such means as etching, a method of forming an antenna by partially installing a metallic layer, a method of forming an antenna by using a conductive ink and a method of forming an antenna by winding a metallic thin wire into a coil are known.

Examples of prior art disclosing these antenna-forming methods include JP Patent Publication Hei 11(1999)-134461A to Horio and its U.S. counterpart, U.S. Pat. No. 6,160,526; JP Patent Publication Hei 10(1998)-320519A to Ikefuji, et al. and its EP counterpart, EP 1014301A1; JP Patent Publication Hei 8(1996)-287208A to Orihara, et al. and its US counterpart, U.S. Pat. No. 5,705,852, JP Patent Publication 2002-074301A to Okamura, et al. and its US counterpart, US 2002/24475; JP Patent Publication 2000-251047A to Hayashi, et al. and its EP counterpart, EP 1033778A2; and JP Patent Publication 2000-105810A to Hayashi, et al. and its EP counterpart, EP 1039411A1. Disclosures of those references can be referred to, for further explanation of their techniques.

On the other hand, retroreflective sheetings and retroreflective molded articles which are installed with a multiplicity of retroreflective units (hereafter collectively referred to as "retroreflective sheeting") are used for traffic signs, safety instruments, reflective stickers, commercial sign boards and optical-sensor reflectors, particularly for safety and display instruments in the nighttime, which reflect light toward their light sources.

In such retroreflective sheeting, a multiplicity of micro glass bead type or cube corner prism type retroreflective units are installed inside of the sheeting, which are so designed that incident light into the retroreflective units from a light source is reflected toward the light source.

For example, U.S. Pat. No. 4,025,159 to McGrath discloses a retroreflective sheeting using micro glass bead type retroreflective units; U.S. Pat. No. 4,588,258 to Hoopman discloses a retroreflective sheeting using cube corner prism type retroreflective units; and U.S. Pat. No. 6,083,607 to Mimura discloses a retroreflective sheeting using cube corner prism type retroreflective units whose retroreflective angularity is improved.

Moreover, as a product equipped with a retroreflective sheeting and a storage medium, JP Publication Sho 59(1984)-58630A to Tsukane, et al. discloses a product having a retroreflective layer constituted of glass beads and a magnetic recording layer.

JP Patent Announcement Hei 9(1997)-508983A to Bantli discloses an integrated retroreflective electronic display device. This patent discloses, according to descriptions in its specification, a retroreflective apparatus for visual and electromagnetic data communication, said apparatus comprising retroreflective sheeting for retroreflecting incident light, said sheeting having visual informations thereon, and comprising a base sheet having a monolayer of retroreflective microspheres which are embedded in one of its surfaces and a regular light reflecting means which is disposed under said microspheres as spaced therefrom by a transparent material; antenna means for electromagnetic communication; and coupling means for allowing coupling to said antenna means.

JP Patent Announcement Hei 11(1999)-505050 to Bantli discloses an electronic license plate having a security identification device. According to disclosures of its specification, said patent discloses an electronic license plate architecture for use in an electronic vehicle communication system in which a plurality of remote traffic management stations communicate with the electronic license plate, comprising a license plate portion, including visual identification information and an identification means for storing restricted information, the restricted information including at least one type of vehicle identification information, and wherein the restricted information cannot be altered by the remote stations or by the vehicle; information means for storing unrestricted information, wherein the unrestricted information can be altered by at least one of the remote stations or by the vehicle; communication means, operatively connected to the identification means and to the information means, for processing communications with the remote stations; antenna means for transmitting and receiving the communications with the remote stations; and attachment means fixed to the vehicle for replaceably attaching the license plate portion on the vehicle, such that the license plate portion can be replaced without having to replace the information means.

JP Patent Publication Hei 4(1992)-229244A to Martin discloses a method for making a retroreflective microprismatic sheeting partially free from a metallic layer, said method comprising partially forming an adhesive layer on a metallic deposit layer formed on surfaces of retroreflective microprisms and removing a portion of said metallic layer which is unprotected by said adhesive layer. It also states that the partially provided adhesive layer (protective coating material) is desirably a pressure-sensitive adhesive which will not be unduly affected during a solvent treating step in later processing. Furthermore, as one of the methods for providing said layer, printing is named.

Furthermore, JP Patent Publication Hei 1(1989)-231004A to Martin discloses a method for making a retroreflective microprism sheet partially free from a metallic layer, which comprises forming a metallic deposit layer on surfaces of retroreflective microprisms, partially forming an adhesive layer on said metallic deposit layer and removing the metallic layer in the areas unprotected by said adhesive layer; and a method for making a retroreflective microprism sheet partially free from a metallic layer, which comprises partially installing a coating material on the retroreflective microprism surfaces, vapor depositing a metal thereon and removing the partially laid coating material.

Methods of removing vapor-deposited layers with laser also have been generally practiced.

U.S. Pat. No. 4,200,875 to Galanos discloses a method of forming an image on an exposed lens type retroreflective sheeting in accordance with a predetermined pattern by a laser method.

However, none of the above patents discloses an integrated circuit enclosed retroreflective product which is characterized by comprising an integrated circuit module having a built-in integrated circuit(s), a retroreflective element and their carrier layer(s); more specifically, an integrated circuit enclosed retroreflective product in which said integrated circuit module has a built-in radio frequency identification type integrated circuit, and a communication antenna connected to the radio frequency identification type integrated circuit is installed; still more specifically, an integrated circuit enclosed retroreflective product in which said communication antenna is formed on the reflective surfaces of said retroreflective units.

Problems to be Solved by the Invention

The above contact-type IC card has a problem that informations stored in the IC card cannot be communicated without inserting the card into a reader/writer. Moreover, a non-contact-type IC card has a problem that the IC card must approach up to a distance at which radio waves can recognize the card and therefore, radio waves cannot previously recognize the card outside the recognition distance.

Furthermore, in case of a tollage settlement system (hereafter referred to as non-stop automatic toll system) by interactive radio communication using a non-contact type IC card on a toll road, there is a problem that it is usually necessary for each vehicle to install an in-vehicle read-and-write unit to assist the communication with the IC card, because of long distance lying between the IC card and an external reader/writer (road side antenna).

Furthermore, until a vehicle approaches said reader/writer (road side communication antenna) near enough to allow the communication with the IC card on the vehicle, it is difficult for the reader/writer to distinguish vehicles carrying IC cards from those ordinary ones paying their tolls in cash. In particular, there is a problem at tollgates which concurrently run non-stop automatic toll systems and collect tollage in cash, especially in the nighttime, that toll collectors cannot make visual distinction in advance.

Furthermore, while it is not impossible in the daytime to advancedly recognize from afar IC card built-in vehicular identification stickers ("IC stickers") stuck on e.g., glass windows of vehicles for the purpose of certifying parking permit, staff identification, tax payment, vehicular identification, etc., it is impossible in the nighttime to confirm, particularly from a distant place, presence of the stickers.

Means to Solve the Problems

As a means to solve the problems as observed in the above, the present invention provides a means to enable toll collectors to recognize presence of IC cards in advance of their approach to a distance at which IC cards and reader/writers can mutually communicate, by installing a multiplicity of retroreflective units in each IC card in which integrated circuit module(s) are enclosed, said units retroreflecting incoming light from outside toward the light source.

More specifically, the invention provides an integrated circuit enclosed retroreflective product characterized by comprising at least an integrated circuit module in which integrated circuit(s) are built in, a retroreflective element, and their carrier layer(s), in which multiplicity of retroreflective elements are installed on either one of the carrier layer(s), whereby enabling retroreflection of incoming light from outside toward the light source.

"Retroreflective element" used in the present invention is composed of cube-corner prismatic retroreflective units (occasionally abbreviated as "CC units") or of micro glass bead-type retroreflective units.

In preferred embodiments of the retroreflective element according to the invention, CC units each having three reflective surfaces which are perpendicular to each other, such as triangular pyramidal CC units, hexagonal CC units, or tent-formed CC units, can be used. Particularly, triangular pyramidal CC units are preferred because they easily form a micro size retroreflective element and hence enable to form thin products.

These CC units can be used as specular reflection type CC units which reflect light on their prismatic reflective surfaces, as provided with a metallized thin film layer thereon like micro glass bead-type retroreflective units; or they may be used as total internal reflection type CC units which reflect light on their prismatic reflective surfaces according to the principle of total internal reflection, by providing on their prismatic backs a layer of a low refractive index, such as air. The latter total internal reflection type CC units do not require a deposited metallized thin film layer, unlike micro glass bead type retroreflective units, and hence the appearance of the integrated circuit enclosed retroreflective products are not darkened by the color of the metallized thin film layer. Hence, use of such total internal reflection type CC units advantageously advances recognizability.

Moreover, in the case of a non-contact type integrated circuit enclosed retroreflective product, total internal reflection type CC units are preferred, as compared with micro glass bead type retroreflective units or specular reflection type CC units because of the lack of a metallic thin-film layer which absorbs radio waves that are used for communication. While a similar effect of preventing radio wave absorption can be achieved using micro glass bead type retroreflective units where no metallized thin firm layer is provided, the resulting reduction in retroreflective area causes a drawback of decreased advance recognizability.

Micro glass bead type retroreflective units can be used in enclosed lens form which is prepared by optionally adhering a thin resin film layer on micro glass beads preferably having a diameter ranging 30-500 µm and a refractive index ranging 1.4-2.5, for adjusting their focal distance where necessary, and thereafter covering 40-70% of the surface area of the micro glass beads with a metallized thin film layer of, for example, aluminum or silver, by such means as vapor deposition or chemical plating, to increase their retroreflectivity.

A preferred embodiment of using such enclosed retroreflective units is a retroreflective sheeting whose retroreflective portion is formed of micro glass bead retroreflective units of 30-500 µm in diameter. The surface of such a sheeting is covered with a smooth and transparent surface protective layer. Where the retroreflective units have a diameter less than 30 µm, diffusion of light due to diffraction becomes excessive and tends to undesirably reduce retroreflectivity. Whereas, retroreflective units having a diameter exceeding 500 µm render the sheeting thickness large. This is less manageable and causes undesirable reduction in image sharpness.

In another form of micro glass bead type retroreflective clement, encapsulated lens type retroreflective units may be used, which is preferably used for a retroreflective sheeting whose retroreflective portion is composed of micro glass bead retroreflective units of 30-500 µm in diameter and the plastic film serving as its surface protective layer has smooth surface and is transparent. Similar to said enclosed lens type retroreflective sheeting, the retroreflective units having diameters less than 30 µm cause excessive light diffusion due to diffraction effect and their retroreflectivity is undesirably decreased, while those having diameters more than 500 µm render the sheeting thickness unduly large and decrease sharpness of formed images.

The carrier layer constituting the product of the invention may be divided into core layer(s) to carry integrated circuit module(s) and further into inner layer(s) to carry the core layer, retroreflective element or antenna(s). It is also permissible to provide upper and lower protective layers on the carrier layer, to protect the front and back of the product of the present invention.

These integrated circuit module(s) and retroreflective element can be installed on said upper and lower protective layers or the carrier layer composed of core layer(s) and/or inner layer(s), in the product of the present invention.

On said upper or lower protective layers used in the present invention, a multiplicity of retroreflective units can be installed, and further as necessity demands, concurrently other layers such as a printed layer, alteration-preventing layer such as a non-retroreflective metallic thin film layer or a hologram layer, and layer of magnetic stripes or uneven embossing, may be installed.

In particular, a hologram layer exhibits excellent effect to prevent alteration. It can be formed on each layer, by forming an uneven layer which forms a hologram by a method known per se, and further providing a thin metallic layer such as of aluminum where necessary. Furthermore, in such an occasion of forming a thin metallic layer for hologram, a peelable layer such as of silicone resin can be partially provided on the lower surface of the metallic layer for hologram. This causes partial separation between the peeling layer and the thin metallic hologram layer in an attempt to strip off a once adhered product of the present invention, and renders removal of the sheeting as a whole difficult, whereby effectively preventing its theft.

As a resin to be used for the upper protective layer, core layer or inner layer, in particular, the layer on which said retroreflective units are installed, a transparent resin sheeting having a total light transmittance of 50% or more, such as of vinyl chloride resin, acrylic resin, polyester resin, polycarbonate resin, or styrene resin can be used. Those particularly preferred are acrylic resin, polyester resin and polycarbonate resin, from the viewpoint of heat resistance. Particularly, for the retroreflective integrated circuit enclosed products used as installed on vehicles, it is deseirable to use a resin which has a high heat resistance so that the retroreflective property of the products is not deteriorated even at a high temperature of 90° C. because the product may be exposed to high temperatures during parking under the blazing sun.

Coloring agents such as various pigments, dyes, fluorescent pigments, or fluorescent dyes may be added to the upper protective layer in order to improve appearance; or an ultraviolet absorber, light stabilizer, antioxidant or the like, in order to improve weatherability and heat resistance. Use of fluorescent coloring agent is advantageous because it excels in visibility at daytime.

The following are examples of preferable ultraviolet absorbers that can be added.

Hydroquinone-derived Ultraviolet Absorbers:
hydroquinone, hydroquinone disalicylate, etc.

Salicylic Acid-derived Ultraviolet Absorbers:
phenyl salicylate, para-octylphenyl salicylate, etc., Benzophenone-derived Ultraviolet Absorbers:
2-hydroxy-4-methoxybenzophenone,
2-hydroxy-4-n-octoxybenzophenone,
2-hydroxy-4-methoxy-2-carboxybenzophenone,
2,4-hydroxybenzophenone,
2,2-hydroxy-4,4-dimethoxybenzophenone,
2-hydroxy-4-benzoyloxybenzophenone,
2,2-hydroxy-4-methoxybenzophenone,
2-hydroxy-4-methoxy-5-sulfonbenzophenone,
2,2,4,4-tetrahydroxybenzophenone,
2,2,-hydroxy-4,4-dimethoxy-5-sodiumsulfobenzophenone,
4-dodecyloxy-2-hydroxybenzophenone,
2-hydroxy-5-chlorobenzophenone, etc.

Benzotriazole-derived Ultraviolet Absorbers:
2-(2-hydroxy-5-methylphenyl)benzotriazole,
2-(2-hydroxy-5-methylphenyl)-5-carboxylic acid butyl ester benzotriazole,
2-(2-hydroxy-5-methylphenyl)-5,6-dichlorobenzotriazole,
2-(2-hydroxy-5-methylphenyl)-5-ethylsulfonbenzotriazole,
2-(2-hydroxy-5-tert-butylphenyl)-5-chlorobenzotriazole,
2-(2-hydroxy-5-tert-butylphenyl)benzotriazole,
2-(2-hydroxy-5-amylphenyl)benzotriazole,
2-(2-hydroxy-3,5-dimethylphenyl)benzotriazole,
2-(2-hydroxy-3,5-dimethylphenyl)-5-methoxybenzotriazole, 2-(2-methyl-4-hydroxyphenyl)benzotriazole,
2-(2-stearyloxy-3,5-dimethylphenyl)-5-methylbenzotriazole,
2-(2-hydroxy-5-phenylcarboxylate)benzotriazole ethyl ester,
2-(2-hydroxy-3-methyl-5-tert-butylphenyl)benzotriazole,
2-(2-hydroxy-3,5-di-tert-butylphenyl)-5-chlorobenzotriazole,
2-(2-hydroxy-5-methoxyphenyl)benzotriazole,
2-(2-hydroxy-5-phenylphenyl)-5-chlorobenzotriazole,
2-(2-hydroxy-5-cyclohexylphenyl)benzotriazole,
2-(2-hydroxy-4,5-dimethylphenyl-5-carboxylic acid benzotriazole butyl ester,
2-(2-hydroxy-3,5-dichlorophenyl)benzotriazole,
2-(2-hydroxy-4,5-dichloro)benzotriazole,
2-(2-hydroxy-3,5-dimethylphenyl)-5-ethylsulfonbenzotriazole,
2-(2-hydroxy-5-phenylphenyl)benzotriazole,
2-(2-hydroxy-4-octoxyphenyl)benzotriazole,
2-(2-hydroxy-5-methoxyphenyl)-5-methylbenzotriazole,
2-(2-hydroxy-5-methylphenyl)-5-carboxylic acid ester benzotriazole,
2-(2-acetoxy-5-methylphenyl)benzotriazole.
2-(2-hydroxy-3,5-di-tert-butylphenyl)-5-chlorobenzotriazole, etc.

Among these ultraviolet absorbers, benzophenones and benzotriazoles are preferred. Inter alia, as benzophenones, 2,3-dihydroxy-4,4-dimethoxybenzophenone, 2,2-dihydroxy-4-methoxybenzophenone and 2,2,4,4,-tetrahydroxybenzophenone are effective; and as benzotriazoles,
2-(2-hydroxy-5-methylphenyl)benzotriazole,
2-(2-hydroxy-5-methylphenyl)-5,6-dichlorobenzotriazole,
2-(2-hydroxy-5-tert-butylphenyl)benzotriazole,
2-(2-hydroxy-3-methyl-5-tert-butylphenyl)benzotriazole,
2-(2-hydroxy-3,5-di-tert-butylphenyl)-5-chlorobenzotriazole,
2-(2-hydroxy-5-phenylphenyl)-5-chlorobenzotriazole,
2-(2-hydroxy-3,5-di-tert-butylphenyl)-5-chlorobenzotriazole,
2-(2-hydroxy-5-octoxyphenyl)benzotriazole, etc., are effective.

Commercial benzotriazole-derived or Benzophenone-derived ultraviolet absorbers may also be used. As examples of benzotriazole-derived ultraviolet absorber, SEESORB™ 701, 702, 703, 704, 706, and 709 made by Shipro Kasei Kaisha, Ltd., ADKSTAB™ LA31 and LA32 made by Asahi Denka Co., Ltd., SUMISORB™ 250 made by Sumitomo Chemical Company, Limited; and VIOSORB™ 590 made by Kyodo Chemical Co., Ltd. can be named. Furthermore, examples of useful benzophenone-derived ultraviolet absorbers include ADKSTAB™ 1413 and LA51 made by Asahi Denka Co., Ltd., SEESORB™ 1001 and 103 made by Shipro Kasei Kaisha, Ltd.; and SUMISORB™ 110S made by Sumitomo Chemical Company, Limited.

As the light stabilizer, hindered-amine light stabilizers are particularly preferred. Moreover, it is possible to blend a hindered-amine light stabilizer into a layer containing a fluorescent dye of a retroreflective sheeting of the present invention in order to improve weatherability, where necessary. As the hindered-amine light stabilizers useful in such occasions, piperidine type hindered-amine light stabilizers having a tertiary amine structure with a molecular weight of 600 or more are particularly preferred because they can retain prolonged weatherability.

As examples of useful commercial products, TINUVIN™ 622LD, 765, 144, and CHIMASSORB™ 119FL made by Ciba Specialty Chemicals K.K. JAPAN; ADKSTAB™ LA52 and LA62 made by Asahi Denka Co., Ltd.; and SANOL™ LS2626 made by Sankyo Co., Ltd. can be named.

These hindered-amine light stabilizers can be blended into the layer containing fluorescent dye in an amount in the range of 0.1 to 5 wt % either by itself or concurrently with an ultraviolet absorber or antioxidant.

Moreover, it is possible to introduce the light stabilizer into the skeleton of the resin constituting the layer containing a fluorescent dye, in the form of an ester with, e.g., a (meth) acrylic acid, As examples of such reaction-type light stabilizer, 1,2,2,6,6-pentamethylpiperidyl methacrylate and 2,2,6,6-tetramethylpiperidyl methacrylate can be named. By copolymerizing such a light stabilizer with other reactive monomer constituting the resin such as (meth)acrylate, vinyl acetate or vinyl chloride, it is possible to introduce the group of the light stabilizer into the skeleton of the resin.

Moreover, it is possible to blend a benzoate-derived light stabilizer or the like into the layer containing a coloring agent such as a dye or fluorescent dye, to inpart weatherability to the layer. As an example of useful benzoate-derived light stabilizer, benzoate-derived quencher such as TINUVIN™ 120 made by Ciba Specialty Chemicals K.K. JAPAN can he named.

Examples of useful antioxidant include: as amine-containing antioxidants, those derived from naphthylamine, diphenylamine and phenylenediamine; and as phenolic antioxidants, those derived from quinoline, hydroquinone, monophenol, polyphenol and thiobisphenol.

It is also possible to install a multiplicity of retroreflective units on the lower protective layer used for the present invention or to install thereon a printed layer, alteration-preventing layer formed of vapor-deposited metal or hologram, magnetic stripes or uneven embossing, where necessary. As the useful resin, vinyl chloride resin, acrylic resin, polyester resin, polycarbonate resin, or styrene resin can be used in sheet form. From the viewpoint of heat resistance, use of acrylic resin, polyester resin, or polycarbonate resin is particularly advantageous.

Above-described upper and lower protective layers, core layer and inner layer(s) can be integrated by such means as heat-sensitive adhesive, pressure-sensitive adhesive, thermosetting-, ultraviolet curing-, or electron beam curing-crosslinking type adhesive, or thermal fusion.

It is preferable to provide an air layer on the surfaces of the prismatic reflective units of the layer on which total internal reflection CC units are installed. To form the air layer, it is possible to use the method as disclosed in the McGrath patent.

Furthermore, an adhesive layer for adhering the IC card to an external support such as of glass or plastics can be provided on the surfaces of the upper and lower protective layers. As the adhesive, heat-sensitive adhesive, pressure-sensitive adhesive or crosslinking-type adhesive can be suitably used.

Particularly, where the IC card is to be adhered to a light-transmitting substrate such as the inside of a glass window of a vehicle, it is preferable to use a poly(meth)acrylic resin type pressure-sensitive adhesive from viewpoints of light transmittability and heat resistance. It is also preferable to add the same ultraviolet absorber, light stabilizer or antioxidant as those used for the upper protective layer, each at a rate of 0.05 to 5 wt %, for improving weatherability and heat resistance.

An integrated circuit module used for the present invention is composed of electronic circuits such as CPU (Central Processing Unit), RAM (Random Access Memory), ROM (Read Only Memory), EEPROM (Electronically Erasable Programmable ROM) and the like, and is so designed as to be able to execute processing function, storage function and input/output control function. In the case of a contact-type IC card, external contact terminals are provided.

A non-contact type IC card having no external terminal, which is a preferred embodiment of the present invention, has a built-in non-contact type radio frequency identification type integrated circuit which is generally referred to as RF-ID (Radio Frequency Identification IC) in the module.

Moreover, a communication antenna is installed, which makes it possible for said radio frequency identification IC to communicate with external units. The antenna according to the present invention can be formed on the carrier layer (core layer or inner layer) by mounting a metallic foil or vapor deposited metal in a form of mesh, line, or loop.

Both of said radio frequency identification integrated circuit and communication antenna are enclosed in the product of the present invention, and a power supply connector for supplying power from an external source or an electromagnetic coupling structure through a dielectric for conveying electronic signals are not necessary. Therefore, the antenna and the integrated circuit module of the present invention are coupled either directly or through a jumper, which makes it possible to provide thin, pliable sheet-formed products. As the coupling means, a conductive adhesive, anisotropic bonding sheet, soldering, brazing, or welding can be used.

Non-contact type IC cards are classified into close coupling type (2 mm or less), proximity coupling type (10 cm or less), vicinity coupling type (70 cm or less), and distance type (more than 70 cm), depending on the distance between individual integrated circuit enclosed laminate and the reader/writer to communicate therewith and the type of the antenna used. In general, the close coupling type and proximity coupling type covering relatively short radio range use short waves; the vicinity coupling type, long waves, and the distance coupling type, microwaves.

To form the antenna to be used for the present invention, a partial installation method of partially installing a metallic thin film layer; a partial removal method of partially removing a metallic thin film layer, or a mechanical processing method can be used.

As such partial installation method, it is possible to use a method comprising setting a mask on the layer on which an antenna is to be installed, by such means as printing, masking, or lithography and then installing a metallic thin-film layer of a desired shape of the antenna by such means as vacuum deposition, sputtering, electroplating or chemical plating.

In the occasion of installing an antenna on a micro glass bead type retroreflective sheeting by such a partial installation method, it is possible to install the antenna and a metallic thin film layer simultaneously on an identical layer, through the steps of embedding micro glass beads in the micro glass bead type retroreflective sheeting, applying, where necessary, a mask on the thin resin film layer-covered surface of the micro glass beads-embedded layer, and thereafter vapor-depositing a metal such as aluminum thereon. The antenna thus formed shows retroreflective performance. Also in the case of a prism type retroreflective sheeting, it is possible to similarly install an antenna and a metallic thin-film layer on the same layer at the same time on the reflective surfaces of the prisms.

In the partial removal method, a metallic thin film layer is formed in advance on the layer on which the antenna is to be installed, by such means as vapor deposition, sputtering, electroplating or chemical plating, and thereafter said metallic thin film layer is partially removed in a pattern corresponding to the desired shape of the antenna by such means as chemical etching, dry etching, laser illumination or a mechanical removal method such as sandblasting.

In the occasion of installing an antenna on the retroreflective sheeting by said partial removal method, a preferred method comprises forming a metallic thin film layer such as of aluminum or the like on an entire surface of a micro glass bead type retroreflective sheeting or prismatic retroreflective sheeting by a means known per se such as vapor deposition; partially applying an etching solution in a pattern corresponding to the desired shape of the antenna by a printing method to form the antenna by means of chemical etching; and then neutralizing the etching solution and washing it off.

As the chemical agent to be used as such chemical etching solution, various types of acids and alkalis can be used. Examples of useful acids include aqueous solutions of hydrochloric acid, nitric acid, sulfuric acid and phosphoric acid, and examples of useful alkalis include aqueous solutions of sodium hydroxide and potassium hydroxide. Though the concentration of the chemical etching solution needs to be suitably selected in accordance with such factors as the kind of the acid or alkali used, thickness of the metallic thin-film layer and the etching rate, generally it can be 5 to 40 wt %.

To perform such chemical etching by a printing method, it is preferable to add various kinds of macromolecular compounds such as polyethylene glycol, polypropylene glycol, sodium alginate, polyacrylic acid salts, polyvinyl alcohol, and various cellulose derivatives such as hydroxyethylcellulose, carboxylated methylcellulose, and methylcellulose as viscosity modifiers in order to improve the printability. Whereas, the kind and concentration of a usable viscosity modifier can be suitably selected in accordance with individual printing method and printing rate and therefore, they are subject to no special limitation.

Moreover, it is preferable to add a surface active agents to the chemical etching solution in order to improve the wettability of or permeability into the metallic thin-film layer. Kind of usable surface active agents is not particularly restricted. Whereas, those preferred are cationic surfactants such as amine type, ammonium salt type and pyridine derivatives; anionic surfactants such as sulfated oil, fatty acid salts, sulfated ester oils and alkyl sulfates; and nonionic surfactants such as partial fatty acid esters of polyhydric alcohols and fatty acid-ethylene oxide adducts.

Though the printing method is not critical, gravure printing, screen printing or ink jet method are preferred. Moreover, as other removing method, it is possible to use dry etching, laser illumination or mechanical removing method such as sandblasting.

As mechanical processing means, a method of processing a metallic thin plate into an antenna shape by punching or laser processing or processing a thin metallic wire into a loop-form, and mounting so processed antenna on the carrier layer can be practiced.

In any of above methods, the metal to be used as the material of the metallic thin-film layer or antenna can be suitably selected from aluminum, aluminum-magnesium alloy, aluminum-manganese alloy, silver, copper, nickel, copper-nickel alloy, brass and phosphor bronze, which can be used either singly or as a composite or laminate. Particularly, aluminum and copper are preferable because they excel in radio-wave reception performance.

A preferable thickness of the metallic thin-film layer forming the antenna is 0.5 to 500 μm. A metallic thin film layer thickness of less than 0.5 μm is undesirable because it is apt to give rise to such problems that the radio frequency reception performance is deteriorated or the specular reflection characteristic is deteriorated when the metallic thin-film layer is used as the reflective layer of the retroreflective sheeting. Whereas, a metallic thin film layer thickness of more than 500

μm is undesirable because it is liable to invite such problems that the sheeting thickness becomes excessive, flexibility of the sheeting is deteriorated, bendability also is deteriorated, or it causes deterioration in resolution in the occasion of forming the antenna to make it difficult to obtain a sharp antenna pattern.

Moreover, aluminum is particularly preferable because it shows superior optical characteristics when it is used as the metallic thin-film layer of the retroreflective sheeting. An apparatus suitable for continuous vapor deposition of aluminum thin-film layer comprises a vacuum vessel which is capable of maintaining a degree of vacuum at around 7 to $9 \times 10^{-4}$ mmHg, said vacuum vessel accommodating therein a feeder for feeding an original prism sheeting formed of a base sheet and a surface protective layer which is laminated on the light entrance side surface of said base sheet; a take-up winder for winding up the original prism sheeting which has been vacuum-deposition treated; and a heating system installed between the feeder and the take-up winder, which is capable of fusing the aluminum in a graphite crucible with an electric heater. Pure aluminum pellets having a purity of at least 99.99 wt % are put in the graphite crucible and it is possible to vacuum deposit a metallic thin-film layer on surfaces of the retroreflective units to a thickness of, e.g., 0.2 to 2 μm with melted and vaporized aluminum atoms under conditions of, e.g., at an AC voltage of 350 to 360 V, electric current of 115 to 120 A and a treatment rate of 30 to 70 m/min.

When the communication antenna is provided on the reflective surfaces of the prisms in the above-described manner, not only the CC element area on which the antenna is not mounted, but also all other area of the CC element on which the communication antenna is mounted can retroreflect incoming light toward the light source, resulting in excellent recognizability from distant places even in the nighttime. While conventional communication antennas can be installed on flat regions only; the communication antennas according to the present invention, which are installed on prismatic reflective surfaces formed by CC units or specular reflective surfaces formed by micro glass beads, can secure increased antenna areas due to the uneven surface configuration and therefore excel in communicatability.

"Carrier layer" of the present invention is formed of core layer(s) and/or inner layer(s) and any one or each of them holds the integrated circuit module, communication antenna or external terminals. Moreover, a multiplicity of retroreflective units may be installed on any one of said layers.

The core layer has a through-hole or dent into which the integrated circuit module is inserted. While construction material of the core layer can be properly selected, it is preferable to use a material having a high transparency. For example, a transparent resin sheet made of vinyl chloride resin, acrylic resin, polyester resin, polycarbonate resin or styrene resin having the total light transmittance of 50% or more can be used. In particular, acrylic resin, polyester resin and polycarbonate resin arc preferred because of their high heat resistance.

An inner layer is used for mounting an integrated circuit module on the upper or lower surface thereof. While the construction material of the inner layer is not critical, it is preferable to use a material having a high transparency. For example, transparent resin sheet made of vinyl chloride resin, acrylic resin, polyester resin, polycarbonate resin or styrene resin having the total light transmittance of 50% or more can be used In particular, acrylic resin, polyester resin and polycarbonate resin are preferred because of their high heat resistance. Two or more inner layers may be provided.

The above-described upper and lower protective layers, core layer(s), inner layer(s), and adhesive layer(s) are not subject to specific thickness or hardness limitations. However, it is necessary to consider thier heat resistance, weatherability, light transmittance, various mechanical strengths specified by, for example, JIS X6321-11998 and electrostatic characteristics, according to the purpose of their use.

As to the product shape, it is not necessarily limited to the conventional "IC-card size" (85.6 mm×54 mm×0.76 mm), but larger sizes and flexible shapes may be suitably selected.

Effect

Integrated circuit enclosed retroreflective products of the present invention constituted as described above can reflect incoming light toward its light source because a multiplicity of retroreflective units are mounted thereon, as a means to enable an operator of an external reader/writer to recognize the presence of the product from afar even in the nighttime without using any special recognition means, before the product and the reader/writer communicating therewith initiate mutual communication.

More specifically, integrated circuit enclosed retroreflective products of the present invention, which comprise each an integrated-circuit module having at least one built-in integrated circuit a carrier layer formed of core layer(s) and/or inner layer(s) for carrying the module, and upper and lower protective layers for protecting the upper and lower surfaces respectively of the carrier layer, contain a multiplicity of retroreflective units as installed on any one of said layers and whereby reflect incoming light toward its light source, to improve advance recognizability.

The non-contact type products, which are preferred embodiments of the present invention, have an antenna mounted thereon for communication with external units. The antenna is formed of a metal foil or vapor-deposited metal on said core layer or one of inner layers, in suitable pattern such as meshy, linear or looped pattern. With such antenna means, the products can communicate with external units, without any special external coupler for power supply or electromagnetic coupler for mediating electronic information exchange between the antenna and IC module.

Particularly, in the products of the present invention on which a multiplicity of CC units are installed, such a line antenna, loop antenna or the like can be formed directly on the prismatic reflective surfaces of said CC units by such means as vapor deposition, sputtering or chemical plating of a metal such as aluminum or silver. Alternatively, such antennas can be formed by first metallizing the prismatic reflective surfaces of the CC units with such a metal as aluminum or silver, by such means as vapor deposition, sputtering or chemical plating, and thereafter partially removing the metal from prescribed area by such means as etching.

When the antenna is installed directly on the prismatic reflective surfaces of the CC units as above, the antenna-mounted area of the reflective surfaces can retroreflect incoming light toward the light source, just like other areas of the surfaces on which no antenna is mounted, imparting excellent advance recognizability to the product of the present invention in the nighttime. Again, while installation site of an antenna in conventional art is limited to a flat region, in the present invention antennas can be installed on prismatic reflective surfaces of CC units, and so installed antenna can have an antenna area as much as about 1.5 times that of conventionally installed antenna of the same size because of the uneven reflective surface configuration and can perform excellent communication.

As described above, those retroreflective products according to the present invention have achieved notable improvement in visual advance recognizability. As another mode of using the products of the present invention, they can be used as a reflector in, for example, optical passing sensors at parking lot gates or tollgates. The multiplicity of retroreflective units installed in each product according to the present invention provide, for example, visually recognizable advance informations to toll collectors or parking lot managers, and at the same time indicate presence of approaching vehicle(s) by retroreflecting light which is emitted by the light source of the reflection type sensor mounted on the gate to a photoreceiver installed nearby the light source.

BEST MODE FOR CARRYING OUT THE INVENTION

Preferred embodiments of the present invention are described hereinafter, referring to the drawings.

Figure 1:
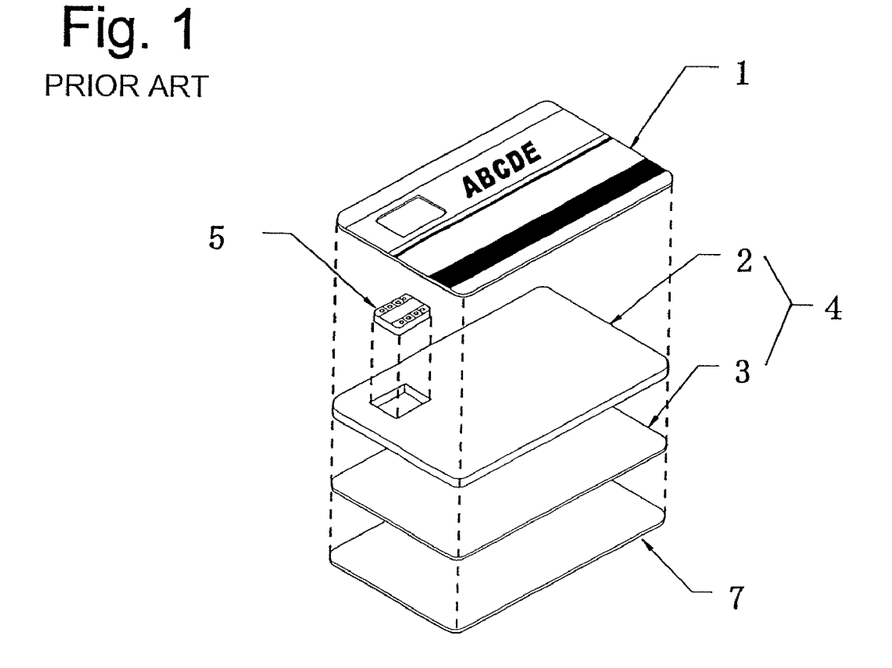
FIG. 1 is an illustration showing a conventional contact type IC card.

FIG. 1 shows a structure of a conventional, known contact type IC card, for comparison with the present invention. The IC card comprises an integrated circuit module (5) having a built-in integrated circuit, a carrier layer (4) formed of a core layer (2) and an inner layer (3) for carrying the module, and an upper protective layer (1) and a lower protective layer (7) for protecting respectively the upper face and lower face of the carrier layer (4), in which the integrated circuit module (5) performs communication through the external terminals which are exposed on the upper protective layer.

Figure 2:
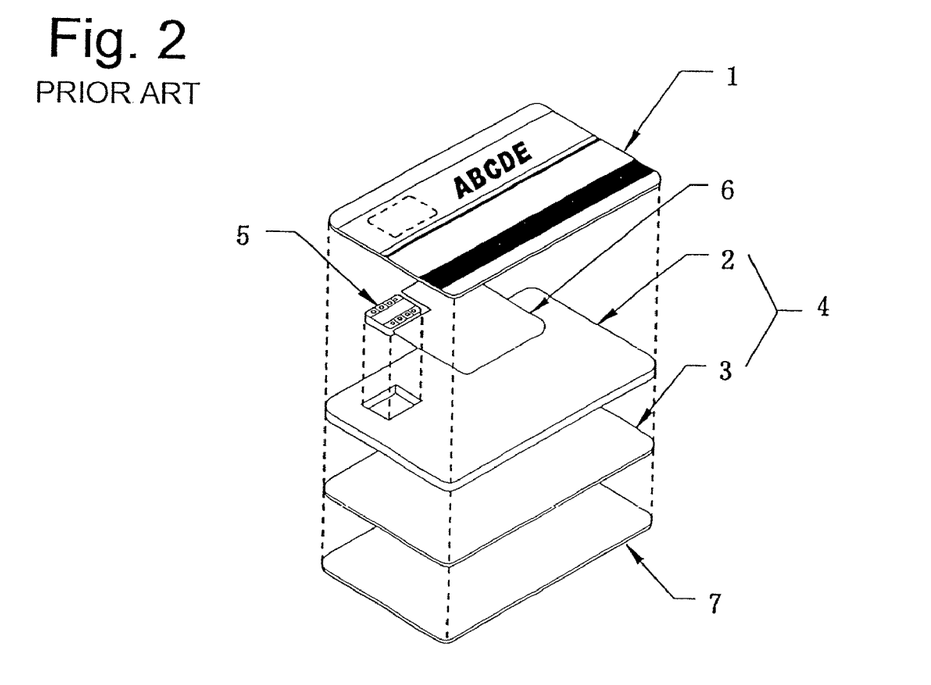
FIG. 2 is an illustration showing a conventional non-contact type IC card.

FIG. 2 shows a structure of a conventional, known non-contact type IC card, for comparison with the present invention. The IC card comprises an integrated circuit module (5) having a built-in integrated circuit, a carrier layer (4) formed of a core layer (2) and/or an inner layer (3) for carrying the module, and an upper protective layer (1) and a lower protective layer (7) for protecting respectively the upper and lower faces of the carrier layer (4), in which a communication antenna (6) is installed on the core layer (2) and the integrated circuit module (5) performs communication with external units through the communication antenna (6).

Figure 3:
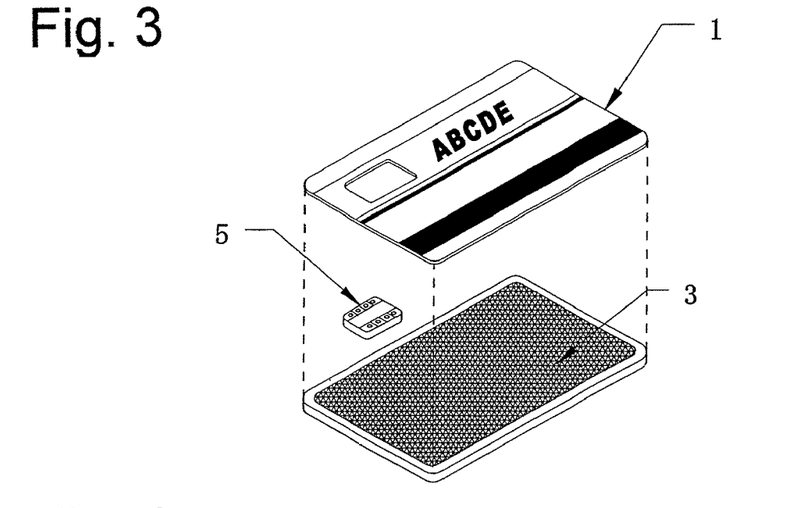
FIG. 3 is an illustration showing a contact type integrated circuit enclosed retroreflective product of the present invention, in which a multiplicity of retroreflective units are installed on an inner layer.

FIG. 3 shows a preferred embodiment of a contact type integrated circuit enclosed retroreflective product of the present invention. The product comprises an integrated circuit module (5) having a built-in integrated circuit and an upper protective layer (1) for protecting the upper face of an inner layer (3) which carries said module, and the integrated circuit module (5) performs communication through the external terminals which are exposed on the upper protective layer.

Said upper protective layer (1) is made of an optically transparent resin, on which a print layer containing visual information, an alteration preventive layer and the like are provided. The inner layer (3) also is made of an optically transparent resin, on which a multiplicity of retroreflective units are installed to reflect incoming light toward the light source.

Figure 4:
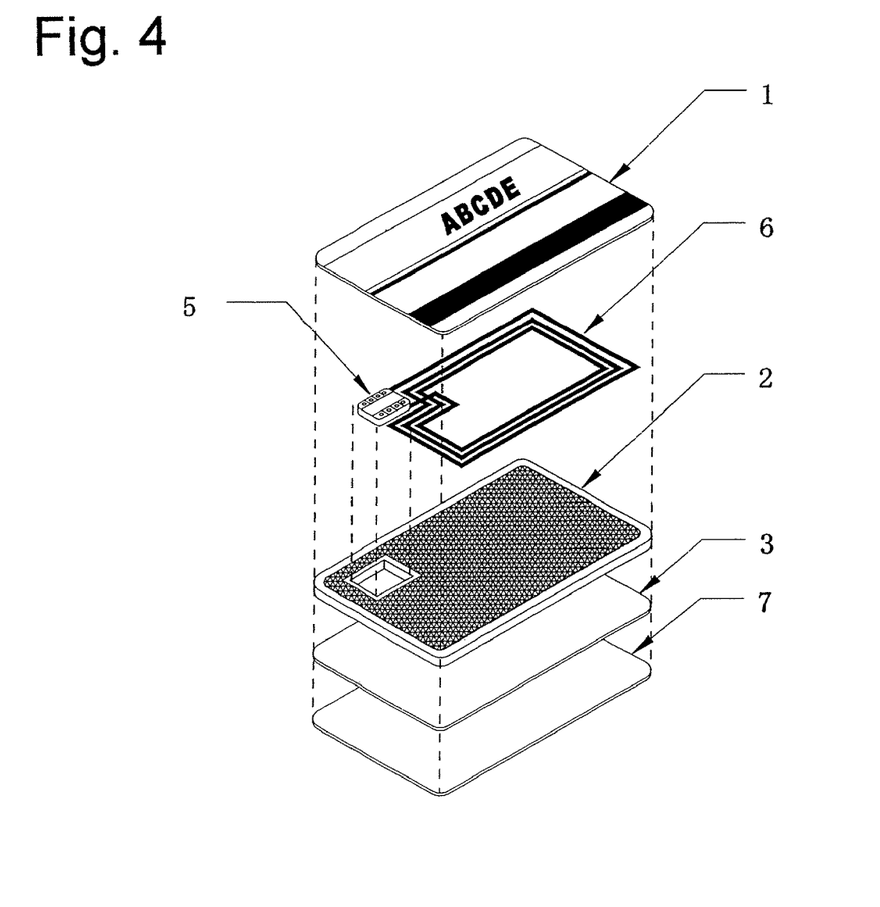
FIG. 4 is an illustration showing a non-contact type integrated circuit enclosed retroreflective product of the present invention, in which a multiplicity of retroreflective units are installed on a core layer.

FIG. 4 shows a preferred embodiment of a non-contact type integrated circuit enclosed retroreflective product of the present invention. The product comprises an integrated circuit module (5) having a built-in integrated circuit, a carrier layer formed of a core layer (2) and an inner layer (3) for carrying the module, and an upper protective layer (1) and lower protective layer (7) for protecting respectively the upper and lower faces of the carrier layer, in which the integrated circuit module (5) performs communication through the loop communication antenna (6) mounted on the core layer.

The upper protective layer (1) is made of an optically transparent resin, on which a print layer containing visual information and an alteration preventive layer are formed. The core layer (2) also is made of an optically transparent resin, on which a multiplicity of retroreflective units are installed to reflect incoming light toward the light source.

Figure 5:
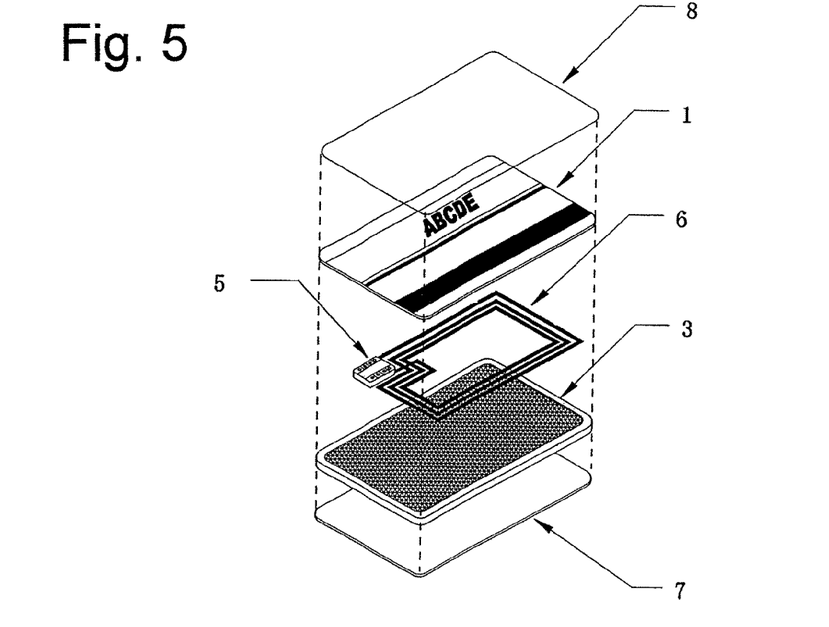
FIG. 5 is an illustration showing a non-contact type integrated circuit enclosed retroreflective product of the present invention, in which a multiplicity of retroreflective units are installed on an inner layer and an adhesive layer is formed on the surface of the upper protective layer.

FIG. 5 shows a preferred embodiment of a non-contact type integrated circuit enclosed retroreflective product of the present invention. The product comprises an integrated circuit module (5) having built-in integrated circuits, an inner layer (3) for carrying the module, and an upper protective layer (1) and lower protective layer (7) for protecting respectively the upper and lower faces of the inner layer, in which the integrated circuit module (5) performs communication through the loop communication antenna (6) mounted on the core layer.

The upper protective layer (1) is made of an optically transparent resin, under which a print layer containing visual information or the like is installed. The inner layer (3) also is made of an optically transparent resin, and on which a multiplicity of retroreflective units are installed to reflect incoming light toward the light source.

Moreover, a transparent adhesive layer (8) is provided on the surface of the upper protective layer (1), to allow the product to be adhered to a light-transmitting substrate such as an inner surface of window glass of a vehicle.

Figure 6:
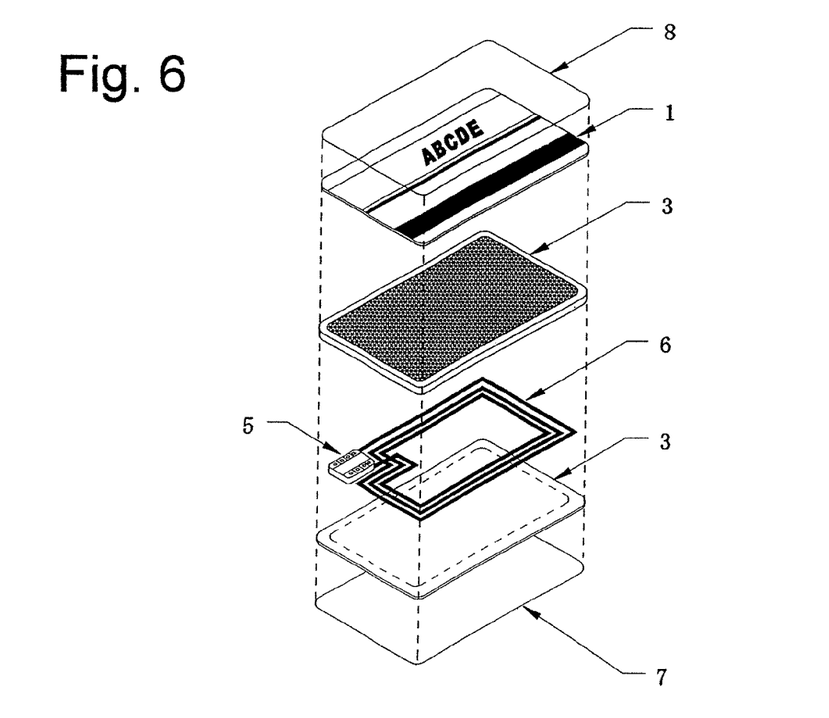
FIG. 6 is an illustration showing a non-contact type integrated circuit enclosed retroreflective product of the present invention, in which a multiplicity of retroreflective units are installed on an inner layer and an adhesive layer is formed on the surface of the upper protective layer.

FIG. 6 shows a preferred embodiment of a non-contact type integrated circuit enclosed retroreflective product of the present invention. The product comprises an integrated circuit module (5) having built-in integrated circuits, a lower inner layer (3) for carrying the module, a lower protective layer (7) for protecting the lower surface of the lower inner layer, an upper inner layer (3) on which a multiplicity of cube-corner-prism-type retroreflective units are installed, and an upper protective layer (1) for protecting the upper surface of the upper inner layer. The integrated circuit module (5) performs communication through a loop communication antenna (6) mounted on the lower surface of the upper inner layer (3) on which a multiplicity of retroreflective units are installed.

The upper protective layer (1) is made of an optically transparent resin, on which a print layer containing visual information and the like is formed. The upper inner layer (3) has a multiplicity of cube corner prism type retroreflective units made also of an optically transparent resin, as installed thereon. Because the loop communication antenna (6) is mounted on the lower surface of the upper inner layer, entrance light into the IC card is reflected in the direction of its light source over the entire surface of the IC card.

Moreover, on the surface of the upper protective layer (1), a transparent adhesive layer (8) is formed to be adhered to a light-transmitting substrate such as the inner face of a glass window of a vehicle.

Figure 7:
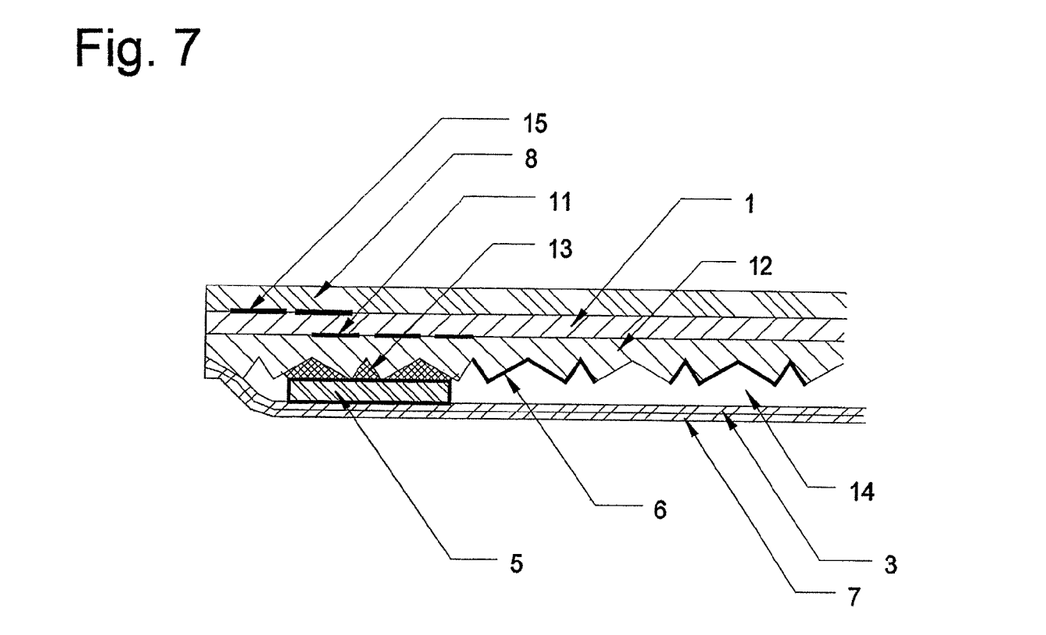
FIG. 7 is a sectional view for explaining FIG. 6.

FIG. 7 shows a cross-section of the non-contact type integrated circuit enclosed retroreflective product shown in FIG. 6. The loop communication antenna (6) formed of a metallic thin film layer is directly installed on the reflective surfaces of the multiplicity of cube corner prism type retroreflective units, The integrated circuit module (5) is mounted on the upper inner layer (3), under which a multiplicity of cube corner prism type retroreflective units are installed, through an adhesive layer (13). An alteration preventive layer (15) is formed on the surface of the upper protective layer (1) and a print layer (11) is formed on the bottom of the layer (1).

Moreover, the upper inner layer (3), under which a multiplicity of cube corner prism type retroreflective units are installed, is hermetically enclosed at its four sides with the lower inner layer (3) and the lower-surface protective layer (7), to form an air layer (14) therebetween.

Figure 8:
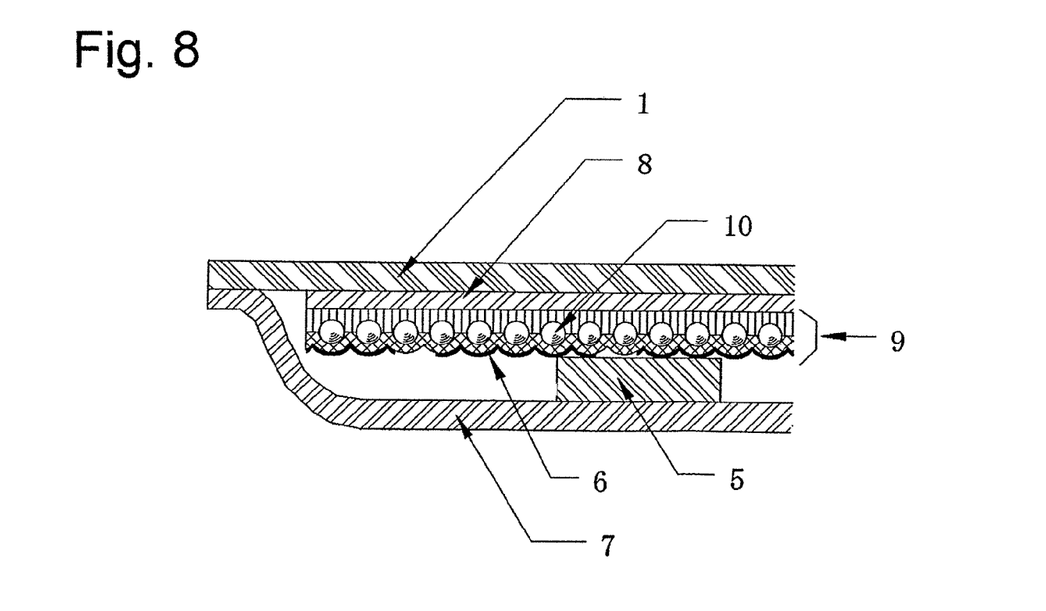
FIG. 8 is an illustration showing a non-contact type integrated circuit enclosed retroreflective product of the present invention, in which a multiplicity of retroreflective units are installed and a metallic thin film layer (specular reflective surface) provided on the reflective surfaces of micro glass beads serving as retroreflective element is partially removed to form an antenna.

FIG. 8 shows a non-contact type integrated circuit enclosed retroreflective product according to the present invention, in which enclosed type micro glass bead retroreflective element (9) is installed and an antenna (6) is formed by partially removing the metallic thin film layer (specular reflective layer) set on the reflective surfaces of those micro glass beads (10).

This antenna (6) may be formed by partial removal method, i.e., by partially removing the metallic thin film layer (specular reflective layer), which is provided on the reflective surfaces of said micro glass beads (10), by such means as etching, or by a partial installation method, i.e., placing a mask on said surfaces of the micro glass beads in the occasion of providing the metallic thin film layer by such means as vapor deposition.

The antenna (6) is directly connected with the radio frequency identification integrated circuit module (5), and a connector or an electromagnetic coupling structure via dielectric is not adopted. The integrated circuit module (5) may be joined to the layer carrying the micro glass bead type retroreflective element (9), by means of an adhesive layer. The layer carrying this micro glass bead type retroreflective element (9) is laminated with an optically transparent upper protective layer (1) at the retroreflective surface thereof and with a lower protective layer (7) at its other side to form a hermetically enclosed structure, with their edges joined by such means as adhesion or thermofusion. Said upper protective layer (1) and the micro glass bead type retroreflective element (9) are joined with an adhesive (8).

A transparent adhesive layer (8) may be provided on the surface of the upper protective layer (1), to allow adhesion to a light-transmitting substrate such as the inner face of a glass window of a vehicle.

The invention claimed is:

1. An integrated circuit enclosed retroreflective product, comprising:
    an integrated circuit module having at least one built-in integrated circuit, and a retroreflective element bearing at least one information carrier layer,
    said retroreflective product bearing an upper or lower protective layer, wherein
    said protective layer bears at least one layer selected from the group consisting of a printed layer, a non-retroreflective metallic thin film layer, a hologram layer, magnetic stripe and uneven embossing,
    said integrated circuit module further comprises a built-in radio frequency identification integrated circuit, with a communication antenna operably connected to said radio frequency identification integrated circuit, and
    said retroreflective element comprising a plurality of total internal reflection type cube corner prism retroreflective units.

2. An integrated circuit enclosed retroreflective product according to claim 1, wherein said communication antenna is formed on an upper layer of the reflective surface of the retroreflective element.

3. An integrated circuit enclosed retroreflective product according to claim 1, wherein said communication antenna is installed on a lower layer on which a specular reflective layer constituting the retroreflective element is partially provided.

4. An integrated circuit enclosed retroreflective product according to any one of claims 1-3, in which said cube corner prism type retroreflective units are specular reflection type cube corner prisms comprising cube corner prisms with a metallic thin film layer formed on surfaces thereof.

5. An integrated circuit enclosed retroreflective product according to any one of claims 1 to 3, in which a printed layer is provided at a position closer to the light-entering side, than those of the retroreflective element and the communication antenna.

6. An integrated circuit enclosed retroreflective product according to claim 4, in which a printed layer is provided at a position closer to the light-entering side, than those of the retroreflective element and the communication antenna.

* * * * *